United States Patent
De Mers et al.

(10) Patent No.: US 9,971,665 B2
(45) Date of Patent: May 15, 2018

(54) SUBSCRIPTION METHODS AND SYSTEMS FOR COMPONENT INFORMATION OF A SYSTEM

(71) Applicant: HONEYWELL INTERNATIONAL INC., Morristown, NJ (US)

(72) Inventors: Robert E. De Mers, Nowthen, MN (US); Wendy Foslien, Woodbury, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 111 days.

(21) Appl. No.: 14/230,982

(22) Filed: Mar. 31, 2014

(65) Prior Publication Data

US 2015/0278071 A1    Oct. 1, 2015

(51) Int. Cl.
*G06F 11/30* (2006.01)
*G06Q 10/00* (2012.01)

(52) U.S. Cl.
CPC ...... *G06F 11/3006* (2013.01); *G06F 11/3079* (2013.01); *G06F 11/3086* (2013.01); *G06Q 10/20* (2013.01)

(58) Field of Classification Search
CPC .................................................. G06F 11/0766
USPC .......................................................... 714/57
See application file for complete search history.

(56) References Cited

U.S. PATENT DOCUMENTS

| | | | | |
|---|---|---|---|---|
| 5,579,231 A * | 11/1996 | Sudou | ............ | G05B 19/41835 700/95 |
| 8,155,817 B2 | 4/2012 | Oesterling | | |
| 8,335,575 B2 * | 12/2012 | Papenfort | .......... | G05B 19/0421 700/23 |
| 2006/0149840 A1 * | 7/2006 | Thompson | .......... | H04L 12/5695 709/224 |
| 2007/0255442 A1 * | 11/2007 | Nakamura | ........... | G05B 23/024 700/108 |
| 2009/0083204 A1 * | 3/2009 | Baier | .................. | G06F 11/3013 706/45 |
| 2009/0089231 A1 * | 4/2009 | Baier | ............... | G05B 19/41875 706/45 |
| 2010/0197238 A1 * | 8/2010 | Pathuri | ............... | H04L 41/0609 455/67.11 |
| 2011/0009715 A1 * | 1/2011 | O'Reilly | ............. | G06F 19/3456 600/302 |
| 2013/0124911 A1 * | 5/2013 | Griffith | .................. | G06F 11/20 714/4.2 |
| 2013/0166569 A1 * | 6/2013 | Navas | ............... | G06F 17/30516 707/747 |
| 2013/0171959 A1 * | 7/2013 | Ahluwalia | ........ | H04W 36/0022 455/405 |
| 2014/0324751 A1 * | 10/2014 | Roberts | .................... | G06N 5/02 706/46 |

(Continued)

FOREIGN PATENT DOCUMENTS

WO       2010071782 A1    6/2010

*Primary Examiner* — Chae M Ko
(74) *Attorney, Agent, or Firm* — Lorenz & Kopf, LLP (57) ABSTRACT

A method of tracking and reporting data associated with a component of a system is provided. The method includes: creating a subscription that is associated with a component of a system based on subscription parameters; receiving component data associated with the component of the system; and generating reporting data based on the subscription and the component data.

14 Claims, 4 Drawing Sheets

(56) References Cited

U.S. PATENT DOCUMENTS

2015/0278071 A1\* 10/2015 De Mers ............. G06F 11/3065
714/57

\* cited by examiner

SUBSCRIPTION METHODS AND SYSTEMS FOR COMPONENT INFORMATION OF A SYSTEM

TECHNICAL FIELD

The present disclosure generally relates to methods and systems for tracking and reporting information about a component of a system.

BACKGROUND

In multi-stage processes, such as component repair and overhaul, it can be difficult to track reports about specific components or faults. It becomes even more difficult when a number of facilities at a number of sites around the world are responsible for the repair and overhaul, such as in aircraft component repair and overhaul. An engineer may have to comb through databases of information from many different sites to learn about faults or issues with the components. In addition, the engineer may never know if the faults or issues were ever discussed.

Hence, there is a need for improved systems and methods for tracking and reporting information about components of a system. Other desirable features and characteristics will become apparent from the subsequent detailed description and the appended claims, taken in conjunction with the accompanying drawings and the foregoing technical field and background.

BRIEF SUMMARY

In one embodiment, a method of tracking and reporting data associated with a component of a system is provided. The method includes: creating a subscription that is associated with a component of a system based on subscription parameters; receiving component data associated with the component of the system; and generating reporting data based on the subscription and the component data.

In another embodiment, a system for tracking and reporting data associated with a component of a system is provided. The system includes a non-transitory computer readable medium. The non-transitory computer readable medium includes a subscription manager that creates a subscription associated with a component of a system based on subscription parameters. The non-transitory computer readable medium further includes a data manager that receives component data associated with the component of the system; and a data reporter that generates reporting data based on the subscription and the component data.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
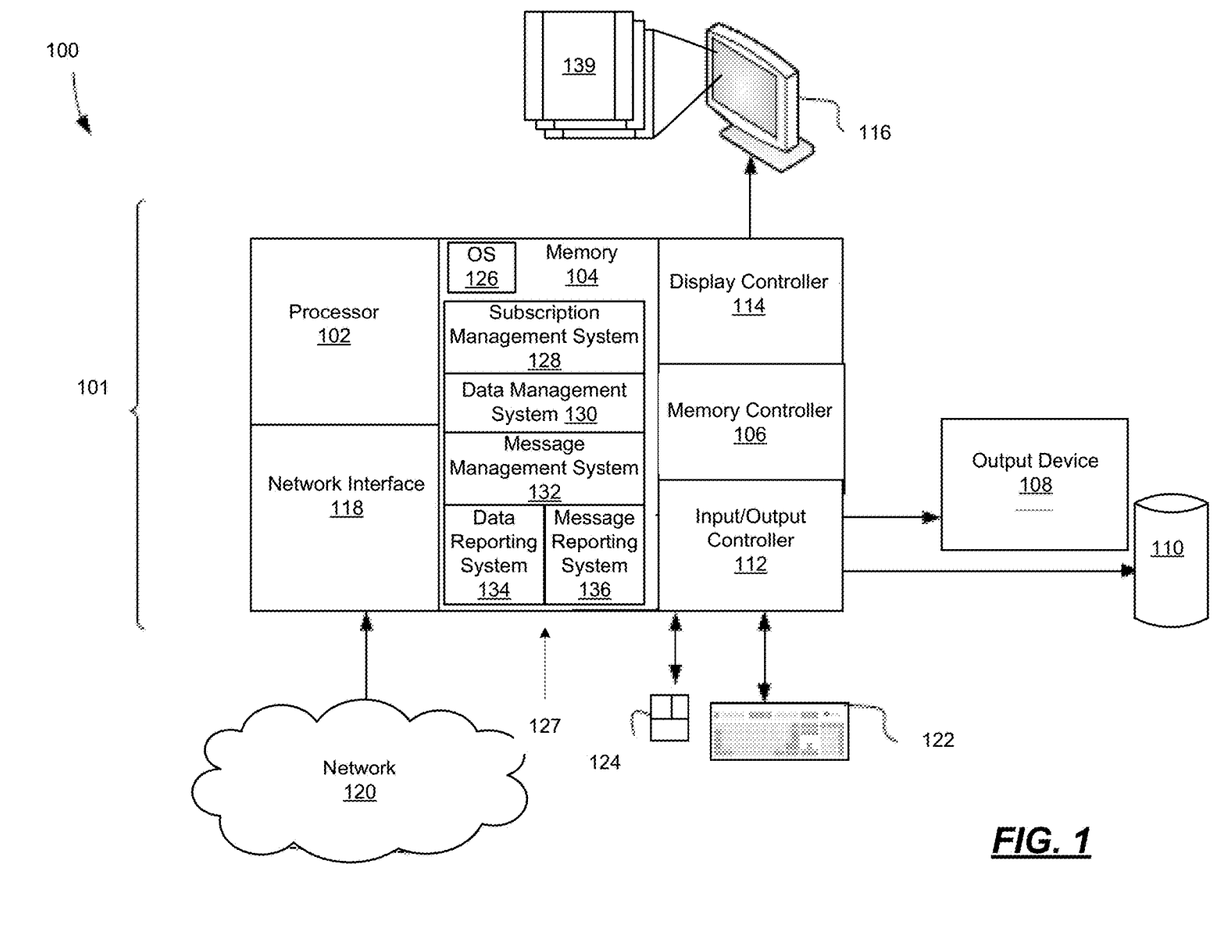
FIG. 1 is a functional block diagram illustrating a computing system that includes a subscription system in accordance with exemplary embodiments.

Referring now to FIG. 1, exemplary embodiments of the present disclosure are directed to a computing system shown generally at 100. As can be appreciated, the computing system 100 described herein can be implemented for any system having multiple components. For example, the computing system 100 can be associated with an aircraft system (or other vehicle system) for allowing users to subscribe to information about aircraft parts (or other vehicle parts). In another example, the computing system can be associated with a facility (e.g., having a single building or multiple buildings) for allowing users to subscribe to information about facility components (e.g., HVAC systems, lighting systems, security systems). In still another example, the computing system can be associated with a manufacturing facility for allowing users to subscribe to information about machines or other components of the manufacturing process. For exemplary purposes, the disclosure will be discussed in the context of a computing system 100 being associated with an aircraft system.

Turning now to FIG. 1 in greater detail, the exemplary computing system 100 is shown to include a computer 101. As can be appreciated, the computer 101 can be any computing device, including but not limited to, a desktop computer, a laptop, a server, a portable handheld device, or any other electronic device, or a number of networked devices. For exemplary purposes, the disclosure will be discussed in the context of the computer being a single server.

The computer 101 is shown to include one or more processors 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122, and a mouse 124, and any other input devices can be coupled to the input/output controller 112. In an exemplary embodiment, the computing system 100 can further include one or more network interfaces 118 for coupling to one or more networks 120. The one or more networks 120 transmit and receive data between the computer 101 and other computing systems using one or more wired or wireless communication protocols.

In various embodiments, the memory 104 stores instructions that can be performed by the processor 102. The instructions stored in memory 104 may include one or more separate programs, each of which comprises an ordered listing of executable instructions for implementing logical functions. When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

In the example of FIG. 1, the instructions stored in the memory 104 include an operating system (OS) 126, and a subscription system shown generally at 127. The subscription system 127 includes a subscription management system 128, a data management system 130, a message management system 132, a data reporting system 134, and a message reporting system 136. As can be appreciated, in various other embodiments, all or parts of the subscription management system 128, the data management system 130, the message management system 132, the data reporting system 134, and the message reporting system 136 can be implemented on a separate storage medium (not shown) or other computing system (not shown), such as another server or other computing device, and can communicate with the computer 101. For exemplary purposes, the disclosure will be discussed in the context of the systems all being implemented entirely on the computer 101.

In general, the operating system 126 essentially controls the performance of computer programs and provides scheduling, input-output control, file and data management, memory management, and communication control and related services. The subscription management system 128 creates and stores subscriptions to component information for various users, entities, or systems. The data management system 130 creates and stores data about components of the particular system. The message management system 132 creates and stores messages communicated between users or entities associated with the particular system. The data reporting system 134 monitors the component data and communicates reports of the data (e.g., through the network interface 118) based on the subscriptions. The message reporting system 136 monitors the message data and communicates reports of the messages (e.g., through the network interface 118) based on the subscriptions. Each of the systems 128-136 may manage a user interface 139 for display by the display 116 or display of a remote system (not shown).

Figure 2:
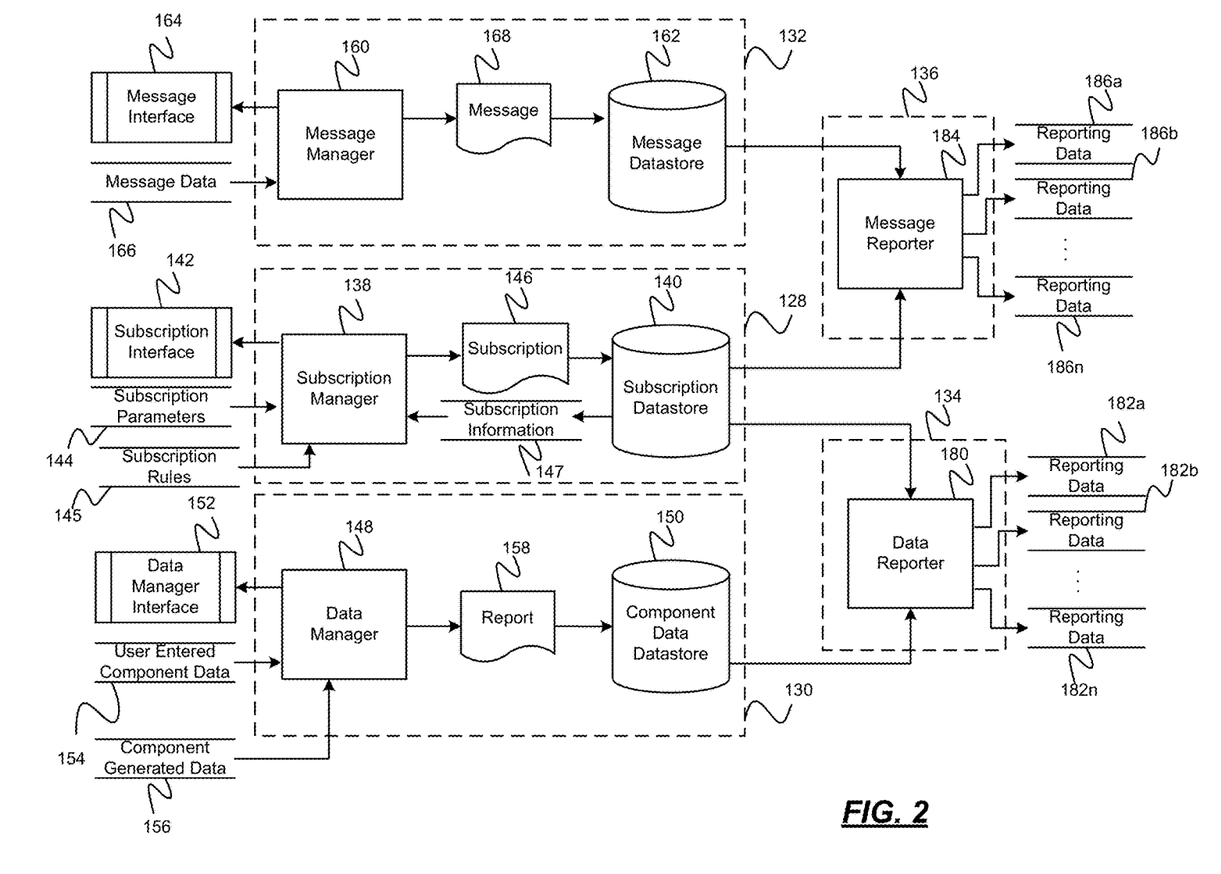
FIG. 2 is a dataflow diagram illustrating the subscription system in accordance with exemplary embodiments.

Referring now to FIG. 2, and with continued reference to FIG. 1, a dataflow diagram illustrates various embodiments of the subscription system 127. Various embodiments of subscription systems 127 according to the present disclosure may include any number of data components embedded on a non-transitory computer readable medium. As can be appreciated, the components shown in FIG. 2 may be combined and/or further partitioned to similarly create subscriptions and communicate reports based on the subscriptions. Inputs to the subscription system 127 may be received from other components (not shown), determined/modeled by other sub-components (not shown), and/or may be user input that is based on a user interacting with one or more user interfaces 139 through one or more of the input devices 122-124.

In various embodiments, the subscription management system 128 includes a subscription manager 138 that communicates with a subscription datastore 140. The subscription manager 138 manages a subscription interface 142 that may be used by a user to define a subscription 146 and/or to look up information 147 about other subscriptions. In various embodiments, the subscription interface 142 includes one or more configuration objects such as, but not limited to, menus, lists, text entry boxes, radio buttons, links, and/or other selection items that may be manipulated by a user to configure subscription parameters 144 and/or to define subscription rules 145. The subscription manager 138 receives the subscription parameters 144 and/or the subscription rules 145 based on a user interacting with the subscription interface 142.

In various embodiments, the subscription parameters 144 indicate components to subscribe to, types of information for each component to subscribe to, how to receive reports of the information for each component to subscribe to (e.g., email, text message, data file, etc.), and/or who (e.g., a single person, or a group) and/or where to send the information to (e.g., an email address, or a phone number, a storage location, etc.). For example, the user can configure the subscription parameters to indicate a particular component of an aircraft system such as an engine component and to indicate particular information about the component to subscribe to, such as fault information, scheduled maintenance information, or repair information. In another example, the user can look up components or faults similar to a selected component or fault and can configure the subscription parameters to indicate similar components and/or similar faults to subscribe to. In another example, the user can look up information on others subscribing to a component or fault and can configure the subscription parameters 144 to indicate similar components and/or faults as the other subscribers. In yet another example, the user can further configure the subscription parameters 144 such that information about high criticality engine components are communicated by text message to the user, such that information about medium criticality engine components is communicated by email message to the user, and information about low criticality engine components is sent to a data file (e.g., to be viewed by the user).

In various embodiments, the user can use the subscription parameters 144 to configure subscription rules 145. For example, the user can configure if-then subscription rules such as, if a particular engine component failure occurs, then subscribe the user to all reports on all components associated with the particular engine component. As can be appreciated, other subscription parameters 144 and other subscription rules 145 are contemplated to be within the scope of the invention and thus the subscription parameters 144 and the subscription rules 145 are not limited to the provided examples. The subscription manager 138 stores the subscription parameters 144 and/or the subscription rules 145 as the subscription 146 for a user in the subscription datastore 140 for future use.

The data management system 130 includes a data manager 148 that communicates with a component data datastore 150 to store data reports 158 about various components of the system. The data in the data reports may be generated based on, for example, a smart device completing a built-in-test, based on a technician dispensing a part during teardown, based on a stage of a process flow (e.g., shipped, teardown, analysis, rebuild, in transit, install, etc.), based on hours in use, based on time of year, based on calendar events, based on a personnel capacity in a servicing center associated with the component, and/or based on any other data generating event associated with a component.

The data manager 148 manages a data manager interface 152 that may be used by a user to enter information about a component of the system. In various embodiments, the data manager interface 152 includes one or more configuration objects such as, but not limited to, menus, lists, text entry boxes, radio buttons, links, and/or other selection items that may be manipulated by a user to enter component data 154. The data manager 148 receives the user entered component data 154 based on a user interacting with the data manager interface 152.

In various embodiments, the user entered component data 154 includes information about the component including a component identifier, a status of the component (e.g., good, poor, fair, etc.), and/or descriptions of issues or any other information about the component. For example, the component data 154 for an engine component of an aircraft system may include a part number, an assembly number, a part name, a status of the part, a description of faults of the part, and/or any other information about the component such as static parameters about the component, such as engine size, serial number, manufacture date, etc. The data manager 148 stores the user entered component data 154 as a data report 158 for the component in the component data datastore 150 for future use.

In addition to or alternative to receiving the user entered component data 154, the data manager 148 receives component generated component data 156 from a component. The component generated component data 156 can be retrieved from the component (e.g., via a bar code, or other identifier) and/or can be received from the component either through a wired or wireless communication. The component generated data 156 may be a collection of data from a single component or multiple components having a data processing and communication device (i.e., a smart component). The component generated data 156 similarly includes information about the component including a component identifier, a status of the component (e.g., good, poor, fair, etc.), descriptions of issues with the component, and/or notifications for scheduled maintenance of the component. The component generated data 156 may include static parameters about the component, such as engine size, serial number, manufacture date, etc. The data manager 148 stores the component generated component data 156 as a data report 158 for the component in the component data datastore 150 for future use.

The message management system 132 includes a message manager 160 that communicates with a message data datastore 162. The message manager 160 manages a message manager interface 164 that may be used by a user to communicate information to one or more other users about the component and/or system (i.e., an email interface, or a social media type interface, etc.). In various embodiments, the message manager interface 164 includes one or more configuration objects such as, but not limited to, menus, lists, text entry boxes, radio buttons, links, and/or other selection items that may be manipulated by a user to enter message data 166. The message manager 160 receives the message data 166 based on a user interacting with the message manager interface 164. The message data 166 may include information associated with a message such as, sender data, recipient data, subject data, and content data. The message manager 160 stores the message data 166 as a message 168 in the message data datastore 162 for future use.

The data reporting system 134 includes a data reporter 180 that communicates with the subscription datastore 140 and the component data datastore 150. The data reporter 180 generates reporting data 182a-182n based on the reports 158 in the component data datastore 150 and based on one or more of the subscription parameters 144 and/or subscription rules 145 in the subscriptions 146 of the subscription datastore 140. For example, the data reporter 180 determines a trigger event (i.e., an event defined by the received data that is of interest to a subscriber) based on the subscription parameters 144 and/or the subscription rules 145.

The data reporter 180 then evaluates the report 158 as it is saved or after it is saved to the subscription datastore 140 and generates reporting data 182a-182n when it is determined that a trigger event has occurred (i.e., one or more users have subscribed to the contents of that report 158 based on the occurrence of the event). In another example, the data reporter 180 evaluates a number of reports 158 after they are saved to the subscription datastore 140 and generates reporting data 182a-182n when it is determined that one or more trigger events has occurred (i.e., one or more users have subscribed to the contents of the reports 158 or to a summary of the contents of the reports 158). The data reporter 180 then communicates the reporting data 182a-182n based on the subscription parameters 144 and/or the subscription rules 145 in the subscriptions 146 of the subscription datastore 140.

The message reporting system 136 includes a message reporter 184 that communicates with the subscription datastore 140 and the message data datastore 162. The message reporter 184 generates reporting data 186a-186n based on the message 168 in the message data datastore 162 and based on one or more of the subscription parameters 144 in the subscriptions 146 of the subscription datastore 140. For example, the message reporter 184 determines a trigger event (i.e., an event defined by the message data that is of interest to a subscriber) based on the subscription parameters 144 and/or the subscription rules 145.

The message reporter 184 then evaluates the message 168 as it is saved or after it is saved to the subscription datastore 140 and generates reporting data 186a-186n when it is determined that one or more trigger events has occurred (i.e., one or more users have subscribed to the contents of that message 168). In another example, the message reporter 184 evaluates a number of messages 168 after they are saved to the subscription datastore 140 and generates reporting data 186a-186n when it is determined that one or more trigger events has occurred (i.e., one or more users have subscribed to the contents of the message 168 or to a summary of the contents of the messages 168). The message reporter 184 then communicates the reporting data 186a-186n based on the subscription parameters 144 in the subscriptions 146 of the subscription datastore 140.

Referring now to FIGS. 3-7, and with continued reference to FIGS. 1-2, flowcharts illustrate methods that can be performed by the subscription system 127 in accordance with various embodiments. As can be appreciated in light of the disclosure, the order of operation within the methods is not limited to the sequential execution as illustrated in FIGS. 3-7, but may be performed in one or more varying orders as applicable and in accordance with the present disclosure.

Figure 3:
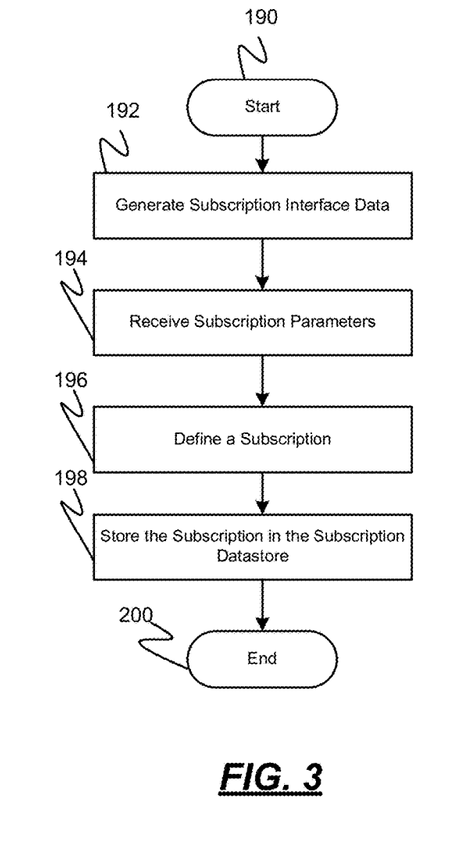
FIGS. 3-7 are flowcharts illustrating methods that may be performed by the subscription system in accordance with exemplary embodiments.

In various embodiments, the methods can be scheduled to run based on predetermined events, and/or can run continually during operation of the computing system 100. With particular reference to FIG. 3, a subscription setup method that may be performed by the subscription management system 128 is shown. In one example, the method may begin at 190. The subscription interface data for displaying the subscription interface 142 is generated at 192. The subscription parameters 144 are received at 194 based on a user interacting with the subscription interface 142. The subscription 146 is defined based on the subscription parameters 144 at 196. The subscription 146 is stored in the subscription datastore 140 at 198. Thereafter, the method may end at 200. As can be appreciated, this method may be performed any time a user elects to set up or modify a subscription.

Figure 4:
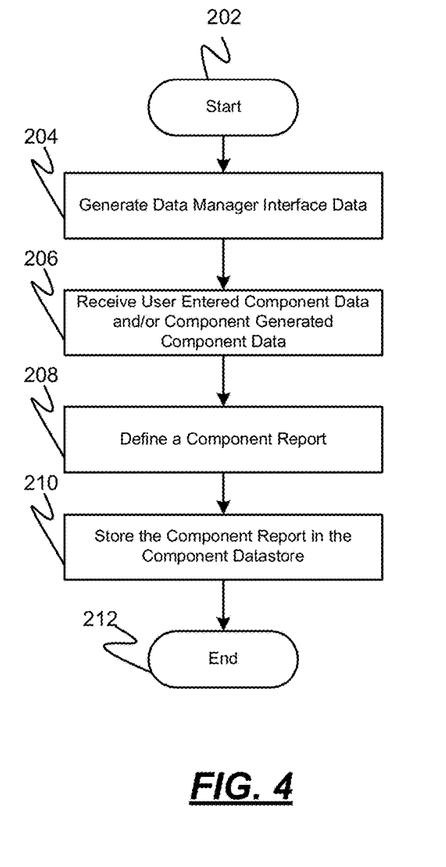

With particular reference to FIG. 4, a data management method that may be performed by the data management system 130 is shown. In one example, the method may begin at 202. The data management interface data for displaying the data manager interface 152 is generated at 204. The user entered component data 154 and/or the component generated component data 156 is received at 206 based on a user interacting with the data manager interface 152 and/or based on a transmission of the component generated component data 156. The data report 158 is defined based on the component data 154, 156 at 208. The report 158 is stored in the component data datastore 150 at 210. Thereafter, the method may end at 212. As can be appreciated, this method may be performed any time a user elects to set enter component data 154 and/or any time component generated component data 156 is received.

Figure 5:
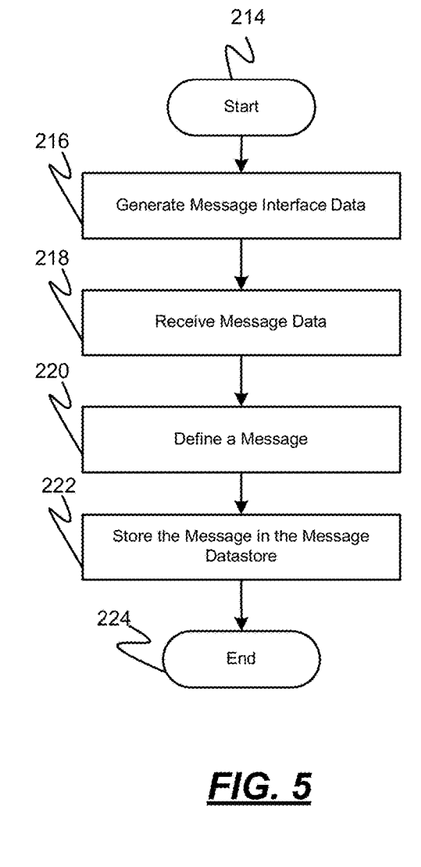

With particular reference to FIG. 5, a message management method that may be performed by the message management system 132 is shown. In one example, the method may begin at 214. The message management interface data for displaying the message manager interface 164 is generated at 216. The message data 166 is received at 218 based on a user interacting with the message manager interface 164. The message 168 is defined based on the message data 166 at 220. The message 168 is stored in the message data datastore 162 at 222. Thereafter, the method may end at 224.

Figure 6:
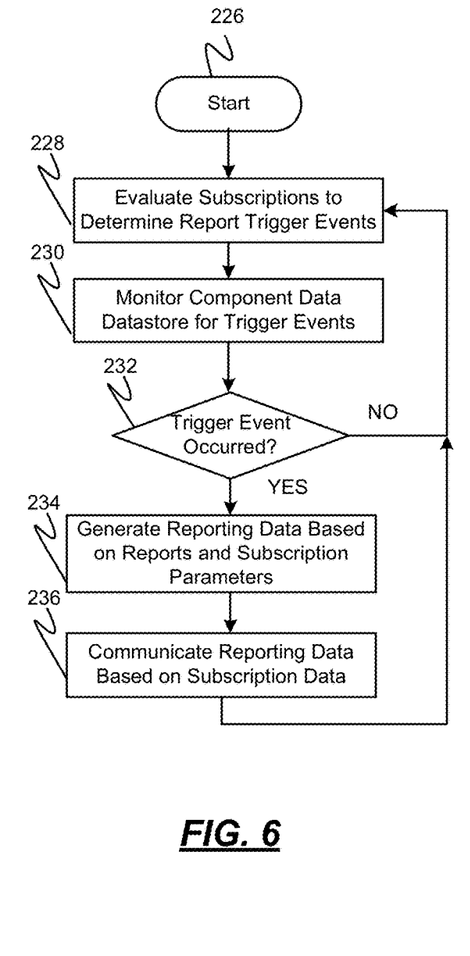

With particular reference to FIG. 6, a data reporting method that may be performed by the data reporting system 134 is shown. In one example, the method may begin at 226. The subscriptions 146 in the subscription datastore 140 are evaluated at 228 to determine trigger events for generating reporting data 182*a*-182*n*. The data reports 158 stored in the component data datastore 150 are monitored at 230 based on the triggered events. If a data report 158 does not include a trigger event, then the method continues with evaluating the subscriptions 146 at 228. If, however, one or more data reports 158 includes a trigger event at 232, the reporting data 182*a*-182*n* is generated based on the report 158 and/or other report information and further based on the subscription parameters 144 (e.g., what information of the report the user wishes to be reported). The reporting data 182*a*-182*n* is then communicated to the user or users based on the subscription parameters 144 at 236 (e.g., based on what means of communication was desired by the user for the particular type of report). Thereafter, the method may return to evaluating the subscriptions 146 at 228.

Figure 7:
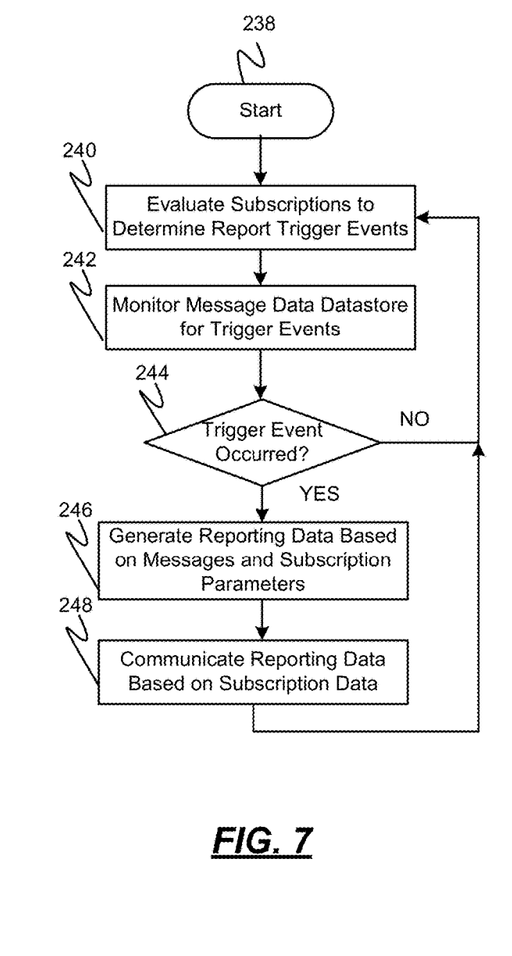

With particular reference to FIG. 7, a message reporting method that may be performed by the message reporting system 136 is shown. In one example, the method may begin at 238. The subscriptions 146 in the subscription datastore 140 are evaluated at 240 to determine trigger events for generating reporting data 186*a*-186*n*. The messages 168 stored in the message datastore 162 are monitored at 242 based on the trigger events. If a message 168 does not include a trigger event at 244, then the method continues with evaluating the subscriptions 146 at 240. If, however, one or more messages 168 includes a trigger event at 244, the reporting data 186*a*-186*n* is generated based on the message 168 and/or other messages 168 and further based on the subscription parameters 144 (e.g., what information of the message 168 the user wishes to be reported). The reporting data 186*a*-186*n* is then communicated to the user based on the subscription parameters 144 at 248 (e.g., based on what means of communication was desired by the user for the particular type of report). Thereafter, the method may return to evaluating the subscriptions 146 at 240.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A subscription method of tracking and reporting data associated with a component of a system, comprising:
   generating a plurality of reporting data from a first, a second and a third type of interface data wherein the step of generating the first, the second and the third type of interface data from a subscription interface data, a data manager interface data, and a message interface data comprises:
      receiving, for the subscription interface data, subscription parameters for defining a subscription and for storing the subscription in a subscription data store;
      receiving, for the data manager interface data, user entered component data and component generated data for defining a component report and for storing the component report in a component data store; and
      receiving, for the message interface data, message data for defining a message and for storing the message in a message data store; and
   evaluating a plurality of subscriptions to determine and to report trigger events by, in a first instance, monitoring the component data store for trigger events and, in a second instance, monitoring the message data store for trigger events wherein in the first instance, generating the reporting data from the plurality of reporting data based on reports and subscription parameters and in the second instance, generating the reporting data from the plurality of reporting data based on messages and subscription parameters and.

2. The method of claim 1, wherein the subscription parameters indicate at least one of types of information associated with a component to subscribe to, a communication medium for receiving the reporting data, who to send the reporting data to, and where to send the reporting data to.

3. The method of claim 1, wherein the creating the subscription is further based on a subscription rule.

4. The method of claim 1, further comprising receiving the subscription parameters based on a user interacting with a user interface.

5. The method of claim 1, wherein the receiving the component data is based on a user interacting with a user interface.

6. The method of claim 1, further comprising communicating the reporting data based on at least a particular subscription.

7. The method of claim 1, further comprising communicating the message reporting data based on at least a particular subscription.

8. A subscription system for tracking and reporting data associated with a component of a system, comprising:
   a non-transitory computer readable medium comprising:
      a data manager configured for generating a plurality of reporting data from a first, a second and a third type of interface data wherein the first, the second and the third type of interface data are generated by the data manager by processing:
         a subscription interface data of the first type of interface data generated by receiving subscription parameters for defining a subscription and for storing the subscription in the subscription data store;
         a data manage interface data of the second type of interface data generated by receiving user entered component data and component generated data for defining a component report and for storing the component report in the component data store; and
         a message interface data of the third type of interface data generated by receiving message data for defining a message and for storing the message in the message data store; and
      a subscription manager configured for evaluating a plurality of subscriptions to determine and to report trigger events by, in a first instance, monitoring the component data store for trigger events and, in a second instance, monitoring the message data store for trigger events wherein in the first instance, generating the reporting data from the plurality of reporting data based on reports and subscription parameters and in the second instance, generating the reporting data from the plurality of reporting data based on messages and subscription parameters.

9. The system of claim 8, wherein the subscription parameters indicate at least one of types of information associated with a component to subscribe to, a communication medium for receiving the reporting data, who to send the reporting data to, and where to send the reporting data to.

10. The system of claim 8, wherein the subscription manager creates the subscription further based on a subscription rule.

11. The system of claim 8, wherein the subscription manager receives the subscription parameters based on a user interacting with a user interface.

12. The system of claim 8, wherein a data manager receives the component data based on a user interacting with a user interface.

13. The system of claim 8, wherein a data reporter communicates the reporting data based on the subscription.

14. The system of claim 8, wherein a message reporter communicates the reporting data based on the subscription.

* * * * *